US005519488A

United States Patent [19]
Dale, Jr. et al.

[11] Patent Number: 5,519,488
[45] Date of Patent: May 21, 1996

[54] EIGHT SENSOR WHEEL ALIGNER

[75] Inventors: James L. Dale, Jr., Conway; George M. Gill, Vilonia, both of Ark.; Patrick O'Mahony; John Brennan, both of Cork, Ireland

[73] Assignee: FMC Corporation, Chicago, Ill.

[21] Appl. No.: 190,751

[22] Filed: Feb. 1, 1994

[51] Int. Cl.⁶ .......................... G01B 5/24; G01B 5/255
[52] U.S. Cl. ...................... 356/139.09; 33/203.18; 33/288
[58] Field of Search ................. 356/139.09; 33/203.18, 33/288

[56] References Cited

U.S. PATENT DOCUMENTS 3,181,248  5/1965  Manlove .
4,126,943  11/1978  Senften ........................... 33/228
4,341,021  7/1982  Beissbarth ..................... 33/203.18
4,383,370  5/1983  Van Blerk et al. ........... 33/203.18
4,402,603  9/1983  Lill .................................. 33/288
4,718,759  1/1988  Butler .......................... 33/203.18
5,220,399  6/1993  Christian et al. .............. 33/288

Primary Examiner—Stephen C. Buczinski
Attorney, Agent, or Firm—Henry C. Query, Jr.

[57] ABSTRACT

A wheel alignment apparatus comprising eight sensors for measuring the toe angles of the wheels of a vehicle and a computer for calculating toe angle information from any six companion sensors and for comparing the toe angle information calculated using the six sensors with the toe angle information calculated using at least the remaining two sensors to determine if the wheel alignment apparatus is in calibration.

13 Claims, 3 Drawing Sheets

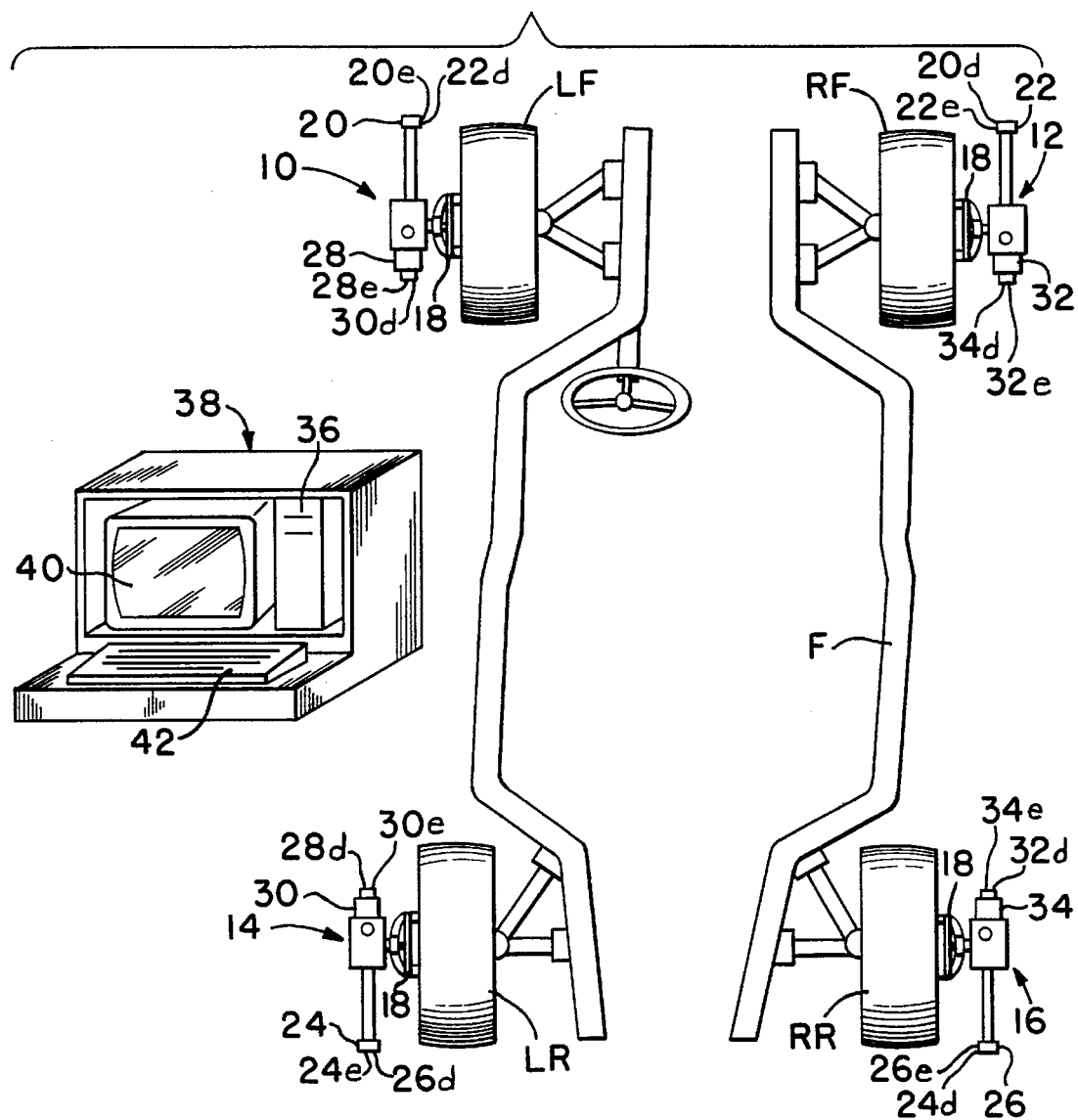
FIG_1

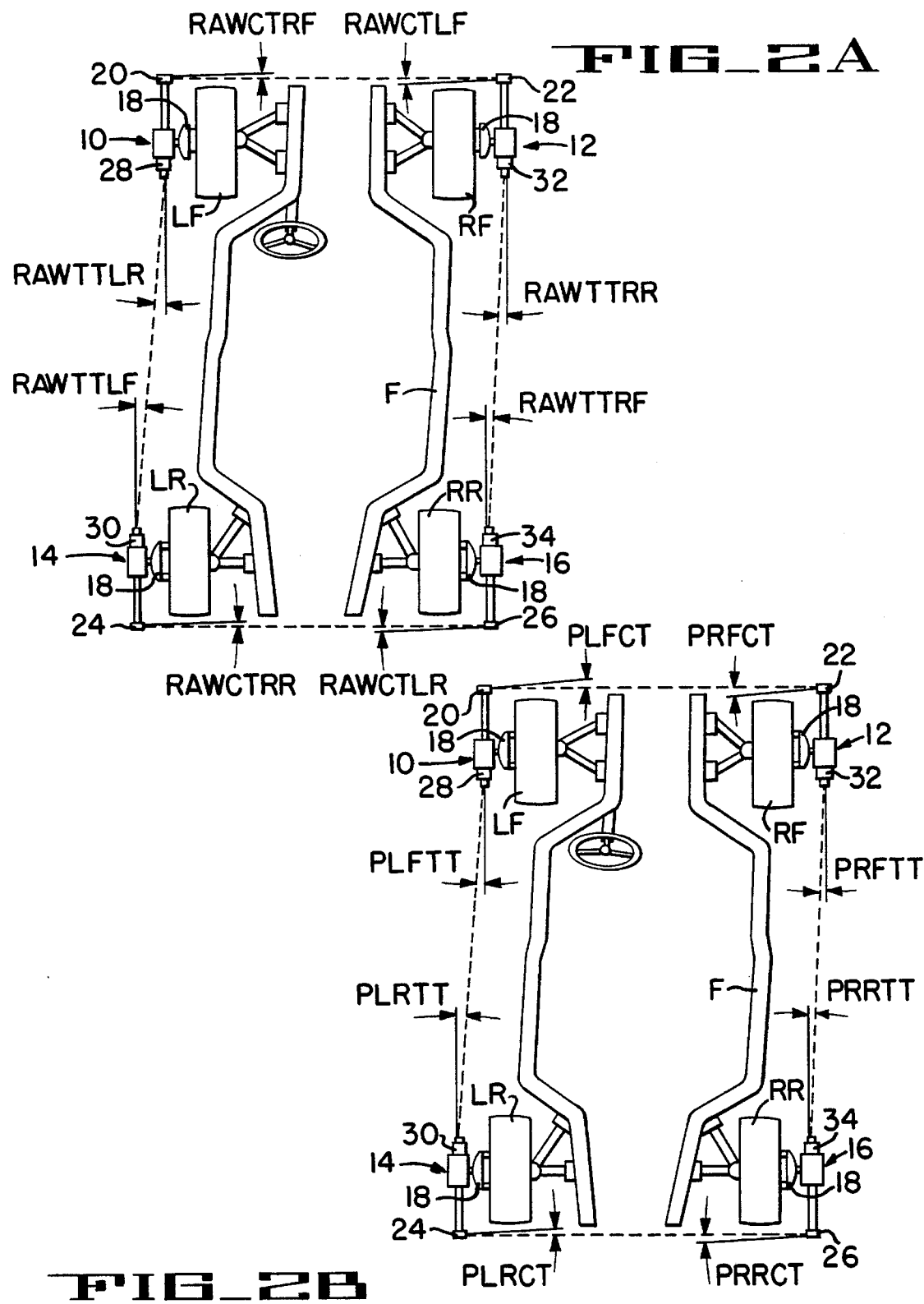

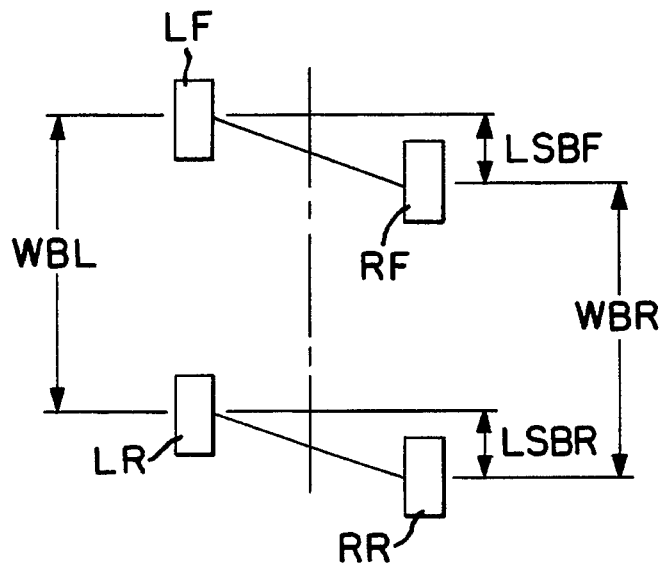
FIG_3
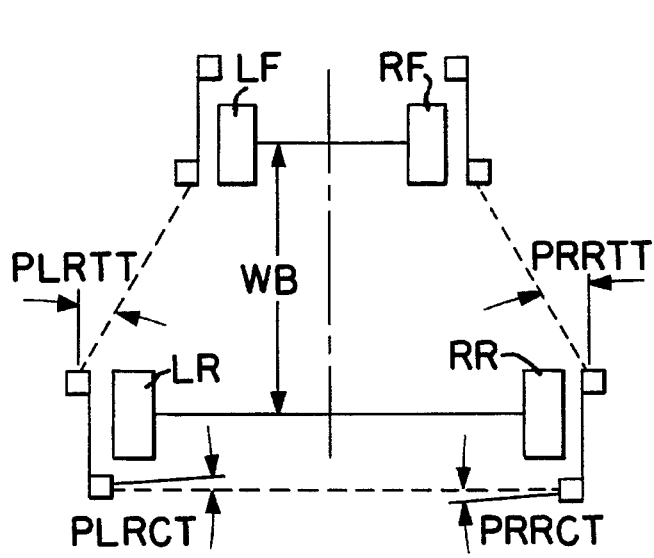
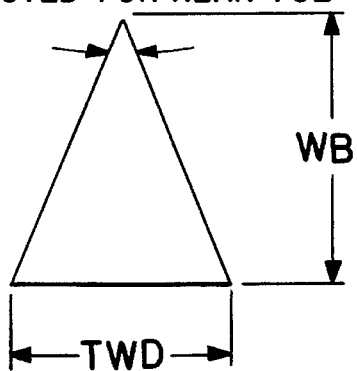
TOTAL REAR TRACK ANGLE
CORRECTED FOR REAR TOE
FIG_4

EIGHT SENSOR WHEEL ALIGNER

BACKGROUND OF THE INVENTION

1. Field of the Invention

This invention relates to a vehicle wheel alignment apparatus which comprises eight sensors for measuring the toe angles of the wheels of a vehicle. More particularly, the invention relates to an apparatus which comprises means for computing the toe angles of the wheels using only six of the sensors in the event that any of the sensors becomes inoperative, and means for comparing the toe angles computed using separate sets of sensors to determine if the apparatus requires calibration.

2. Description of Related Art

Vehicle wheel aligners comprising a toe angle measurement system having eight sensors, or angle measuring instruments, are known in the art. For example, U.S. Pat. No. 4,383,370 issued to Van Blerk et al., which is owned by the assignee hereof, discloses a toe angle measurement system comprising eight electro-mechanical sensors. U.S. Pat. No. 5,220,399 issued to Christian et al., which is also owned by the assignee hereof, discloses a toe angle measurement system comprising eight optical sensors, including optical sensors for measuring the angles between the planes of diagonally-opposed wheels. These and other existing eight-sensor toe angle measurement systems provide increased accuracy when determining the toe angles of the rear wheels of a vehicle.

One problem with many vehicle wheel aligners is that, if a toe angle sensor becomes inoperative, for example if a service technician inadvertently blocks the light beam being transmitted between cooperating optical sensors, the toe angle measurement system is interrupted and toe angle information will consequently not be displayed or if the information is displayed, it will not be current. Another problem with vehicle wheel aligners is that the toe angle measurement system may become out of calibration. If an out of calibration condition is not detected by the service technician, erroneous alignments will result.

SUMMARY OF THE INVENTION

The present invention is directed to a wheel alignment apparatus having a toe angle measurement system which comprises eight sensors and means for computing the toe angles of the wheels using only six of the sensors in the event that any of the sensors becomes inoperative. The means for computing preferably comprises a programmable computer which can detect when a sensor is inoperative and thereafter select an algorithm set for computing the toe angles using the signals generated by the remaining sensors. The computer also compares the toe angle values computed using all eight sensors with corresponding values computed using only six sensors, and notifies the service technician that the system requires calibration when the difference between these values exceeds a predetermined amount. The wheel alignment apparatus according to the present invention also computes wheelbase and track width differences using all eight sensors, thereby eliminating the need for these values to be measured by hand.

These and other objects and advantages of the present invention will be made apparent from the following detailed description, with reference to the accompanying drawings.

BRIEF DESCRIPTION OF THE DRAWINGS

FIG. 1 is a top plan representation of the wheel alignment apparatus of the present invention;

FIG. 2A is a top plan representation illustrating the raw angle values generated by the sensors of the apparatus depicted in FIG. 1;

FIG. 2B is a top plan representation illustrating the processed signals values generated by the sensors of the apparatus depicted in FIG. 1;

FIG. 3 is a diagrammatic plan view of a four wheel vehicle illustrating wheelbase difference; and FIG. 4 is a diagrammatic plan view of a four wheel vehicle illustrating track width difference.

DETAILED DESCRIPTION OF THE PREFERRED EMBODIMENTS

The teachings of the present invention are applicable to wheel aligners comprising various types of toe angle measurement systems. For example, the invention is applicable to wheel aligners which employ electromechanical toe angle measuring units, such as is disclosed in the Van Blerk et al. patent. The invention is particularly applicable, however, to wheel aligners which utilize optical toe angle measuring units. Examples of such wheel aligners are found in U.S. Pat. No. Re. 33,144 issued to Hunter et al., which discloses an angle measure unit having a single optical emitter and two detectors for determining the angle of the impinging beam, and U.S. Pat. No. 5, 177,558 issued to Hill, which discloses an angle measuring unit having a single optical emitter and a single angle determining detector. The preferred embodiment of the present invention, however, will be described with reference to the optical toe angle measurement system disclosed in U.S. Pat. Nos. 4,761,749 issued to Titsworth et al. and 5,208,646 issued to Rogers et al., both of which are owned by the assignee hereof.

Referring to FIG. 1, the wheel alignment apparatus of the present invention is shown in relation to a representation of a vehicle having a frame F and wheels LF (left front), RF (right front), LR (left rear) and RR (right rear). As described more fully in the aforementioned Titsworth et al. and Rogers et al. patents, the wheel alignment apparatus comprises four heads 10, 12, 14 and 16 and a corresponding number of mounting brackets 18 for removably connecting heads 10, 12, 14 and 16 to respective wheels LF, RF, LR and RR. Brackets 18 connect heads 10, 12, 14 and 16 generally parallel to the planes of the wheels, and heads 10, 12, 14 and 16 are pivotally supported from brackets 18 so that they may be positioned in a generally horizontal plane independent of the angular positions of the wheels.

The wheel alignment apparatus includes a toe angle measurement system comprising preferably at least eight optical angle measuring instruments, which are also sometimes referred to as sensors or transducers. The specific structure and operation of the sensors are disclosed more fully in the Titsworth et al. patent and U.S. Pat. No. 4,180,326, issued to change which is also owned by the assignee hereof. Each sensor comprises an emitter, or projector, located in one head and a cooperating detector, or receiver, located in another, or companion, head. The wheel alignment apparatus depicted in FIG. 1 comprises a left front cross toe sensor 20 having an emitter 20e located in head 10 and a detector 20d located in head 12, a right front cross toe sensor 22 having an emitter 22e located in head 12 and a detector 22d located in head 10, a left rear cross toe sensor 24 having an emitter 24e located in head 14 and a detector 24d located in head 16, a right rear cross toe sensor 26 having an emitter 26e located in head 16 and a detector 26d located in head 14, a left front track toe sensor 28 having an emitter 28e located in head 10 and a detector 28d located in head 14, a left rear track toe sensor 30 having an emitter 30e located in head 14 and a detector 30d located in head 10, a right front track toe sensor 32 having an emitter 32e located in head 12 and a detector 32d located in head 16, and a right rear track toe sensor 34 having an emitter 34e located in head 16 and a detector 34d located in head 12. Each emitter comprises an LED array for projecting a plurality of light beams, each at a known angular orientation relative to the plane of the wheel on which the emitter is mounted and at a distinct known time instant. Each detector receives the light beams from its cooperating emitter that are within the detector's field of view and identifies the received beams by their known times of transmission. Therefore, when the received light beams are analyzed to determine which beams most directly impinge on the detector, the angle of the plane of the wheel on which the emitter is mounted with respect to a line of sight between the emitter and the detector is determined.

Sensors 20 through 34 are in communication, either via electrical cables or wireless transmission as disclosed in the Titsworth et al. patent, with a programmable computer 36 located within a console 38. Computer 36 processes the data generated by sensors 20 through 34 according to preprogrammed instructions and displays toe angle information for the vehicle, as well as other information, on a video display 40. A keyboard 42 is provided for entering instructions and vehicle specifications into computer 36. Computer 36 may also access programs and vehicle specifications through a disk or CD ROM drive (not shown).

In the embodiment of the wheel alignment apparatus discussed herein, heads 10 through 16 generate raw data from sensors 20 through 34 that is then sent to console 38. This data is live in that it is refreshed, or generated, several times a second in response to polling instructions received from computer 36. Since sensors 20 through 34 measure angles, the raw data is indicative of the measured angles. The angles are displayed in decimal degrees with a resolution of 0.01 degree. In this embodiment, toe angle raw data generated in a receiver head (a head that houses the detector of a sensor) is actually indicative of the angle of its companion projector head (the head that houses the emitter of the sensor). For example, cross toe angle raw data generated in left front head 10 is determined by the angle of the beam emitted from sensor 22e in right front head 12. Thus, the cross toe angle raw data generated in left front head 10 is indicative of the angular position of right front head 12 and, accordingly, right front wheel RF. All toe angle raw data is signed such that "toe in" is positive and "toe out" is negative. In this embodiment of the wheel alignment apparatus, the raw data that is generated in the heads and transmitted to console 38 is referred to as "Head Raw Sensor Data". The Head Raw Sensor Data values for each head are identified in the following table:

Head Raw Sensor Data Values

HRAWCTLF = raw sensor data for cross toe in left front head
HRAWCTRF = raw sensor data for cross toe in right front head
HRAWCTLR = raw sensor data for cross toe in left rear head
HRAWCTRR = raw sensor data for cross toe in right rear head
HRAWTTLF = raw sensor data for track toe in left front head
HRAWTTRF = raw sensor data for track toe in right front head
HRAWTTLR = raw sensor data for track toe in left rear head
HRAWTTRR = raw sensor data for track toe in right rear head Computer 36 corrects the Head Raw Sensor Data for optical errors and head translation errors before it is displayed as "Displayed Raw Sensor Data". The correction factors for optical errors are determined empirically, and the following values are found to be satisfactory for the embodiment of the wheel alignment apparatus discussed herein:

Optical Correction Factors

OCFCT = optical correction factor for cross toe angles = 0.964539
OCFTT = optical correction factor for track toe angles = 0.918919

The head translation errors occur because, as the wheels of a vehicle are turned through their toe range, the detectors in the heads translate through an arc. This arc is defined by the location of the pivot axis of the wheel and the distance from the detector to the pivot axis. The head translation error is dependent on the arc, the toe angle of the wheel and the distance between a detector and its cooperating emitter. Thus, the translation correction factors are determined from the pivot geometry, the offset of the head from the corresponding wheel centerline, and the vehicle geometry. While actual suspension geometry measurements may be used in the determination of the translation correction factors, the following empirically derived estimates are satisfactory for most applications:

Default Vehicle Geometry Measurements

| | |
|---|---|
| Cross Toe Radius ("CTR"): | = 20.22 inches (car) |
| | = 23.33 inches (truck) |
| Track Toe Radius ("TTR"): | = 16.18 inches (car) |
| | = 20.75 inches (truck) |
| Cross Toe Angle at Zero ("CTAZ"): | = 56 degrees (car) |
| | = 46 degrees (truck) |
| Track Toe Angle at Zero ("TTAZ"): | = 67 degrees (car) |
| | = 72 degrees (truck) |
| Head Offset for Cross Toe ("HOCT"): | = 7.44 inches (car) |
| | = 14.81 inches (truck); |
| Head Offset for Track Toe ("HOTT"): | = −6.5 inches |
| Width between center of tires ("W"): | = 55.5 inches (car) |
| | = 80.0 inches (truck) |
| Length between axles being compared ("L"): | = 106 inches (car) |
| | = 170 inches (truck) |

The cross toe radius and track toe radius are the pivot radii for the respective detectors. Also, the cross toe angle at zero and the track toe angle at zero are the angles between the respective pivot points and detectors when the corresponding wheels are straight, i.e., at zero toe.

The error caused by translation of the measuring head's own detector is referred to as the primary translation error. The primary translation error for cross toe ("PTECT") is determined from the values for cross toe translation error ("CT translation") and cross toe optical spacing error ("CT optical spacing"), which are determined from the following formulas:

CT translation=CTR*[sin (CTAZ)–sin (CTAZ+HRAWCT)];

CT optical spacing=W+2*HOCT, where HRAWCT is the initial Head Raw Sensor Data for the particular cross toe sensor. Thus, PTECT=arcsin (CT translation/CT optical).

Similarly, the primary translation error for track toe ("PTETT") is determined as follows:

PTETT=arcsin (TT translation/TT optical spacing), where

TT translation=TTR*[sin (TTAZ)–sin (TTAZ+HRAWTT)],

TT optical spacing=L+2*HOTT, where HRAWTT is the initial Head Raw Sensor Data for the particular track toe sensor.

The error caused by translation of the companion head's detector is referred to as the companion translation error. The companion translation error for cross toe ("CTECT") is derived as follows:

CTECT=arcsin (CT translation/CT optical spacing), where

CT translation=CTR*[sin (CTAZ)–sin (CTAZ+HRAWCT)],

CT optical spacing=W+2*HOCT.

Similarly, the companion translation error for track toe ("CTETT") is determined as follows:

CTETT=arcsin (TT translation/TT optical spacing), where

TT translation=TTR*[sin (TTAZ)–sin (TTAZ+HRAWTT)],

TT optical spacing=L+2*HOTT.

The Displayed Raw Sensor Data values, which are also referred to herein as the raw angle values, for each particular head are determined from the above-derived correction factors as shown in the following table, wherein the suffixes LF, RF, LR and RR denote the left front, right front, left rear and right rear heads 10, 12, 14 and 16, respectively:

| Displayed Raw Sensor Data Values |
|---|
| RAWCTLF = OCFCT*(HRAWCTLF – PTECTLF + CTECTLF) |
| RAWCTRF = OCFCT*(HRAWCTRF – PTECTRF + CTECTRF) |
| RAWCTLR = OCFCT*(HRAWCTLR – PTECTLR + CTECTLR) |
| RAWCTRR = OCFCT*(HRAWCTRR – PTECTRR + CTECTRR) |
| RAWTTLF = OCFTT*(HRAWTTLF – PTETTLF + CTETTLF) |
| RAWTTRF = OCFTT*(HRAWTTLF – PTETTRF + CTETTRF) |
| RAWTTLR = OCFTT*(HRAWTTLF – PTETTLR + CTETTLR) |
| RAWTTRR = OCFTT*(HRAWTTLF – PTETTRR + CTETTRR) |

These raw angle values, which are illustrated in FIG. 2A, may be displayed on video display 40. As is shown in FIG. 2A, the raw angle values for a particular projector head are generated in its companion receiver head.

These raw angle values are preferably corrected for runout. Runout is the wobble present in the head when the wheel is rotated about its axis. Runout can be caused by an untrue wheel or improper mounting of the head on the wheel. Runout may be calculated, for example, using the runout compensation technique disclosed in U.S. Pat. No. 4,138,825 issued to Pelta, which is owned by the assignee hereof. Runout correction factors are designated herein as "ET", and a separate runout correction factor is calculated for each head. Thus, for example, the runout correction factor for the left front head, head 10, is designated ETLF.

The raw angle values are also corrected to account for calibration factors. Calibration factors represent the zero shift of the raw angle values with respect to the true pivot axis of the head. This could be caused by a mechanical shift in the head itself or a shift in the head's analog electronic amplifier prior to the A/D converter. To correct for presence of a calibration factor, the factor must be subtracted from the raw angle value. Calibration factors can be determined using any well known techniques. For example, cross toe calibration factors may be calculated by mounting the heads on a calibration bar and subtracting the toe plane runout of a projector head from the cross toe raw angle value generated in its companion receiver head. Track toe calibration factors may be determined using an inversion fixture to establish the true plane perpendicular to the pivot axis of the head. The inversion fixture allows the head to be mounted either right side up or upside down with the emitter in the same lateral position. The calibration factor is then defined as the average of the raw track toe angles generated in the receiver head with its companion projector head mounted both right side up and upside down. The calibration factors are designated herein as "CF", and individual calibration factors are calculated for the raw angle values measured in each head. Thus, CFCTLF designates the calibration factor for cross toe in the left front head, CFTTRR designates the calibration factor for track toe in the right rear head, and so on.

In the preferred embodiment of the invention, computer 36 applies the runout and calibration factors to the Displayed Raw Sensor Data, or raw angle, values to derive Processed Signal Values. The Processed Signal Values are intermediate calculations for toe angle measurements that allow better visualization of the angles involved. Computer 36 also converts the raw angle values from the receiver head to the projector head. Thus, as illustrated in FIG. 2B, the Processed Signal Values are representative of the true angle of each named projector head, and not its companion receiver head. The Processed Signal Values are in reference to the position of the companion heads, not the vehicle. Each sensor has a Processed Signal Value, as shown in the following table:

| Processed Signal Values |
|---|
| PLFCT = Processed Signal Value for left front cross toe projector head (head 10) = RAWCTRF – CFCTLF– ETLF |
| PRFCT = Processed Signal Value for right front cross toe projector head (head 12) = RAWCTLF – CFCTRF– ETRF |
| PLRCT = Processed Signal Value for left rear cross toe projector head (head 14) = RAWCTRR – CFCTLR– ETLR |
| PRRCT = Processed Signal Value for right rear cross toe projector head (head 16) = RAWCTLR – CFCTRR– ETRR |
| PLFTT = Processed Signal Value for left front track toe projector head (head 10) = RAWTTLR – CFTTLF– ETLF |
| PRFTT = Processed Signal Value for right front track toe projector head (head 12) = RAWTTRR – CFTTRF– ETRF |
| PLRTT = Processed Signal Value for left rear track toe projector head (head 14) = RAWTTLF – CFTTLR– ETLR |

-continued

Processed Signal Values

PRRTT = Processed Signal Value for right rear
 track toe projector head (head 16)
 = RAWTTRF − CFTTRR− ETRR In normal operation of the wheel alignment apparatus, computer 36 displays the toe angle values which it has calculated using the Processed Signal Values obtained from all eight sensors. The calculations are based on equations derived from rules of geometry. The following table identifies several intermediate variables and toe angle and vehicle geometry values that may be calculated and displayed in a typical wheel alignment apparatus:

| Value | Definition |
|---|---|
| WD | width difference (a value used in other calculations) |
| TAVR | ½ total toe of the rear wheels |
| TAVF | ½ total toe of the front wheels |
| SF | average steering direction of the front wheels |
| SR | average rolling direction of the rear wheels (thrust angle) |
| TLFSR | toe of left front wheel relative to vehicle's thrust line = TAVF + 1.06*SF − SR |
| TRFSR | toe of right front wheel relative to vehicle's thrust line = TAVF − 1.06*SF + SR |
| TLRG | toe of left rear wheel relative to vehicle's geometric centerline = TAVR + SR |
| TRRG | toe of right rear wheel relative to vehicle's geometric centerline = TAVR − SR |
| TLFG | toe of left front wheel relative to vehicle's geometric centerline = TAVF + SF |
| TRFG | toe of right front wheel relative to vehicle's geometric centerline = TAVF − SF |
| TFT | total front toe = TLFSR + TRFSR, or TLFG + TRFG |
| TRT | total rear toe = TLRG + TRRG |
| ASBF | angular setback of front wheels |
| LSBF | linear setback of front wheels |
| ASBR | angular setback of rear wheels |
| LSBR | linear setback of rear wheels |
| WBD | wheelbase difference |
| TWD | track width difference |

In accordance with the present invention, however, computer 36 calculates and displays the toe angle values even if any two companion sensors become inoperative. Companion sensors are those that are housed in companion heads, for example, the left front and right front cross toe sensors 20, 22 located in heads 10 and 12, or the right front and right rear track toe sensors 32, 34 located in heads 12 and 16. The sensors may become inoperative when, for example, the light beams between cooperating emitters and detectors become blocked. Computer 36 recognizes that the companion sensors have become inoperative when, in response to a polling instruction, no data is generated by one or both companion sensors. The respective heads, in turn, transmit an appropriate signal to computer 36 indicating that the companion sensors are inoperative. When this happens, computer 36 accesses an appropriate algorithm set, identified by which companion sensors are inoperative, and computes the above-identified variables and toe angle and vehicle geometry values from the Processed Signal Values generated by the remaining six sensors. These values may then be displayed on video display 40. The following tables list the computations for certain exemplary variables and toe angle values for each of five conditions: all eight sensors operative, front cross toe sensors inoperative, rear cross toe sensors inoperative, left track toe sensors inoperative, and right track toe sensors inoperative:

All Eight Sensors Operative (Condition I)

WD = 0.25*(PLFCT + PRFCT + PLRCT + PRRCT) −
 0.25*(PLFTT + PRFTT + PLRTT + PRRTT)
TAVR = 0.5*(PLRCT + PRRCT)
TAVF = 0.5*(PLFCT + PRFCT)
SF = 0.5*(PLFTT − PRFTT)
SR = 0.5*(PLRTT − PRRTT)
TLFSR = 0.5*(PLFCT + PRFCT) +
 1.06*0.5*(PLFTT − PRFTT) −
 0.5*(PLRTT − PRRTT)
TRFSR = 0.5*(PLFCT + PRFCT) −
 1.06*0.5*(PLFTT − PRFTT) +
 0.5*(PLRTT − PRRTT)
TLRG = 0.5*(PLRCT + PRRCT) +
 0.5*(PLRTT − PRRTT)
TRRG = 0.5*(PLRCT + PRRCT) −
 0.5*(PLRTT − PRRTT)
TLFG = 0.5*(PLFCT + PRFCT) +
 0.5*(PLFTT − PRFTT)
TRFG = 0.5*(PLFCT + PRFCT) −
 0.5*(PLFTT − PRFTT)

Front Cross Toe Sensors Inoperative (Condition II)

WD = same as for Cond. I
TAVR = same as for Cond. I
TAVF = 0.5*(PLRCT + PRRCT −
 PLRTT + PLFTT − PRRTT + PRFTT)
SF = same as for Cond. I
SR = same as for Cond. I
TLFSR = 0.5*(PLRCT + PRRCT − PLRTT + PLFTT −
 PRRTT + PRFTT) + 0.53*(PLFTT − PRFTT) −
 0.5*(PLRTT − PRRTT)
TRFSR = 0.5*(PLRCT + PRRCT − PLRTT + PLFTT −
 PRRTT + PRFTT) − 0.53*(PLFTT − PRFTT) +
 0.5*(PLRTT − PRRTT)
TLRG = same as for Cond. I
TRRG = same as for Cond. I Rear Cross Toe Sensors Inoperative (Condition III)

WD = same as for Cond. I
TAVR = 0.5*(PLFCT + PRFCT + PLRTT − PLFTT +
 PRRTT − PRFTT)
TAVF = same as for Cond. I
SF = same as for Cond. I
SR = same as for Cond. I
TLFSR = same as for Cond. I
TRFSR = same as for Cond. I
TLRG = 0.5*(PLFCT + PRFCT − PLFTT − PRFTT) +
 PLRTT
TRRG = 0.5*(PLFCT + PRFCT − PLFTT − PRFTT) +
 PRRTT Left Side Track Toe Sensors Inoperative (Condition IV)

WD = same as for Cond. I
TAVR = same as for Cond. I
TAVF = same as for Cond. I
SF = −TAVR + PRRTT − PRFTT + TAVF
SR = −PRRTT − WD + TAVR
TLFSR = 1.03*(PLFCT + PRFCT − PLRCT − PRRCT) −
 1.06*PRFTT + 2.06*PRRTT + WD
TRFSR = −0.03*(PLFCT + PRFCT) +
 1.03*(PLRCT + PRRCT) + 1.06*PRFTT −
 2.06*PRRTT − WD
TLRG = PLRCT + PRRCT − PRRTT − WD
TRRG = PRRTT + WD Right Side Track Toe Sensors Inoperative (Condition V)

WD = same as for Cond. I
TAVR = same as for Cond. I
TAVF = same as for Cond. I

-continued $$SF = TAVR - PLRTT + PLFTT - TAVF$$
$$SR = PLRTT + WD - TAVR$$
$$TLFSR = -0.03*(PLFCT + PRFCT) +$$
$$1.03*(PLRCT + PRRCT) + 1.06*PLFTT -$$
$$2.06*PLRTT - WD$$
$$TRFSR = 1.03*(PLFCT + PRFCT - PLRCT - PRRCT) -$$
$$1.06*PLFTT + 2.06*PLRTT + WD$$
$$TLRG = PLRTT + WD$$
$$TRRG = PLRCT + PRRCT - PLRTT - WD$$

As is evident from the tables for Conditions IV and V, the algorithms for computing certain toe angle values when either the left or right track toe sensors are inoperative rely on variable WD. The value for WD is calculated using the Processed Signal Values generated when all eight sensors are operative and is stored by computer 36 for use when either the left or the right track toe sensors subsequently become inoperative. Since the value for WD depends mainly on the geometry of the vehicle, rather than the individual angles of the wheels, the toe angle values computed using the stored value for WD will be accurate measurements of the current toe angles of the wheels.

An advantage of the present invention is the ability of computer 36 to calculate the wheelbase and track width differences from the Processed Signal Values. Referring to FIG. 3, the wheelbase difference is shown to be the difference between the wheelbase of the left wheels and the wheelbase of the right wheels. A positive value for wheelbase difference indicates that the wheelbase of the right wheels is shorter than the wheelbase of the left wheels. The wheelbase difference is related to the linear setback of the front and rear wheels. Thus, wheelbase difference, or WBD, can be derived as follows:

$$\begin{aligned} WBD &= WB\text{ left} - WB\text{ right} \\ &= WB\text{ left} - (WB\text{ left} - LSBF + LSBR) \\ &= LSBF - LSBR. \end{aligned}$$

The values of linear setback are derived from the values for angular setback, which are computed from the Processed Signal Values. Using rules of geometry, the angular setback of the front wheels, or ASBF, is derived as follows:

$$\begin{aligned} ASBF &= 0.5*(PRFCT - PLFCT) + SF \\ &= 0.5*(PRFCT - PLFCT) + 0.5*(PLFTT - PRFTT). \end{aligned}$$

Similarly, the angular setback of the rear wheels, or ASBR, is derived as follows:

$$\begin{aligned} ASBR &= 0.5*(PRRCT - PLRCT) + SR \\ &= 0.5*(PRRCT - PLRCT) + 0.5*(PLRTT - PRRTT). \end{aligned}$$

The sign of angular setback is such that it is positive when the right wheel is rearward of the left wheel. Linear setback for the front (LSBF) and rear (LSBR) wheels is therefore determined as follows:

$$LSBF = (\text{track width})*(\tan(ASBF))$$
$$LSBR = (\text{track width})*(\tan(ASBR)),$$

where the track width may either be a measured or assumed value. Based on the dimensions of an average size vehicle, track width may be assumed to be 60 inches or 1525 millimeters.

FIG. 4 illustrates how the track width difference, or TWD, may be calculated from the Processed Signal Values. Track width difference is the difference between the width of the front wheels and the width of the rear wheels. Thus, TWD is derived using rules of geometry as follows:

$$\begin{aligned} TWD &= \text{wheelbase}*\tan(\text{total rear track toe angle corrected for rear toe}) \\ &= \text{wheelbase}*\tan(PLRTT + PRRTT - PLRCT - PRRCT), \end{aligned}$$

where wheelbase is either obtained from the vehicle specifications, measured by the aligner, or an assumed value. the sign of TWD is such that it is positive when the width of the front wheels is larger than the width of the rear wheels.

According to the present invention, the wheel alignment apparatus also performs a calibration check to determine if the sensors are out of calibration. As described above, computer 36 calculates the toe angle values using different algorithm sets in the event that any two companion sensors become inoperative. However, when all eight sensors are operative, computer 36 also calculates redundant data sets using the remaining four algorithm sets. Computer 36 then compares the toe angle values which are calculated when all eight sensors are operative with corresponding values in a data set calculated using one of the remaining four algorithm sets. An error in calibration in any one sensor will be detected if the Processed Signal Values from the sensor are used to calculate one data set, but not the other. For example, if total toe of the rear wheels is computed with all eight sensors operative, Processed Signal Values from only the rear cross toe sensors are used. If total toe of the rear wheels is then computed with the rear cross toe sensors inoperative, Processed Signal Values from the front cross toe, left track toe and right track toe sensors are used. Since different Processed Signal Values are used, and all the sensors are used to generate these Processed Signal Values, an error in any one sensor will cause the total toe values to be different. This difference is the calibration error, or "TOE CAL ERROR". To allow for minor deviations in calibration and other anomalies, computer 36 will only acknowledge TOE CAL ERRORS greater than 0.10 to 0.20 degree. In addition, computer 36 may store individual TOE CAL ERRORS and average them so that momentary conditions do not falsely signal a problem. When an appropriate TOE CAL ERROR is thus detected, computer 36 will display a suitable message to inform the service technician that the system should be calibrated.

It should be recognized that, while the present invention has been described in relation to the preferred embodiments thereof, those skilled in the art may develop a wide variation of structural and functional details without departing from the principles of the invention. Therefore, the appended claims are to be construed to cover all equivalents falling within the true scope and spirit of the invention.

What is claimed is:

1. An apparatus for determining toe angle information of the supporting wheels of a four-wheeled vehicle which comprises:

companion sensor means mountable relative to the planes of each laterally and longitudinally adjacent pair of wheels for generating data indicative of the relative orientation of each wheel;

means in communication with the sensor means for calculating toe angle information for all four wheels from the data generated by a first set of at least six companion sensor means;

means for determining whether at least one sensor means in the first set of companion sensor means is inoperable; and means responsive to the determining means for calculating toe angle information for all four wheels from the data generated by a second set of at least two companion sensor means when the at least one sensor means in the first set of companion sensor means is inoperable;

wherein the first set of companion sensor means is different from the second set of companion sensor means.

2. The apparatus of claim 1, further comprising means for comparing at least one toe angle value calculated from the first set of companion sensor means with the corresponding toe angle value calculated from the second set of companion sensor means and for indicating that the apparatus is out of calibration when the difference between the toe angle values exceeds a predetermined amount.

3. The apparatus of claim 1, wherein the first set of companion sensor means comprises all eight sensor means and the second set of companion sensor means comprises six of the eight sensor means.

4. The apparatus of claim 1, wherein the first set of companion sensor means comprises all eight sensor means and the second set of companion sensor means comprises the companion sensor means mounted on the longitudinally adjacent pairs of wheels and the companion sensor means mounted on one pair of laterally adjacent wheels.

5. The apparatus of claim 1:
wherein the first set of companion sensor means comprises all eight sensor means and the second set of companion sensor means comprises the companion sensor means mounted on the laterally adjacent pairs of wheels and the companion sensor means mounted on one pair of longitudinally adjacent wheels;

wherein the apparatus further comprises means for calculating a reference value related to the geometry of the vehicle from the data generated by the first set of companion sensor means and means for storing the reference value; and wherein the computing means calculates the set of toe angle values from the data generated by the second set of sensor means and the reference value.

6. The apparatus of claim 5, wherein the reference value is the width difference of the vehicle.

7. An apparatus for determining toe angle values of the wheels of a vehicle having at least two front and two rear wheels which comprises:

at least eight angle measuring instruments mountable relative to the planes of the wheels, including two companion angle measuring instruments mountable to each laterally and longitudinally adjacent pair of wheels, for generating data indicative of the angles between the plane of each wheel and the planes of the laterally and longitudinally adjacent wheels;

computing means in communication with each angle measuring instrument for calculating a set of toe angle values for the vehicle from the data generated by a first set of at least six companion angle measuring instruments and for calculating the set of toe angle values from the data generated by a second set of at least two companion angle measuring instruments;

the first set of companion angle measuring instruments being different from the second set of companion angle measuring instruments;

means for displaying the toe angle values;

means for determining whether at least one angle measuring instrument in the first set of companion angle measuring instruments is inoperative; and means for selecting for display on the displaying means the set of toe angle values determined from the second set of companion angle measuring instruments when the at least one angle measuring instrument in the first set of companion angle measuring instruments is inoperative.

8. The apparatus of claim 7, further comprising means for comparing at least one toe angle value calculated from the first set of companion angle measuring instruments with the corresponding toe angle value calculated from the second set of companion angle measuring instruments and for indicating that the apparatus is out of calibration when the difference between the toe angle values exceeds a predetermined amount.

9. The apparatus of claim 7, wherein the first set of companion angle measuring instruments comprises all eight angle measuring instruments and the second set of companion angle measuring instruments comprises six of the eight angle measuring instruments.

10. The apparatus of claim 7, wherein the first set of companion angle measuring instruments comprises all eight angle measuring instruments and the second set of companion angle measuring instruments comprises the companion angle measuring instruments mounted on the longitudinally adjacent pairs of wheels and the companion angle measuring instruments mounted on one pair of laterally adjacent wheels.

11. The apparatus of claim 7:
wherein the first set of companion angle measuring instruments comprises all eight angle measuring instruments and the second set of companion angle measuring instruments comprises the companion angle measuring instruments mounted on the laterally adjacent pairs of wheels and the companion angle measuring instruments mounted on one pair of longitudinally adjacent wheels;

wherein the apparatus further comprises means for calculating a reference value related to the geometry of the vehicle from the data generated by the first set of companion angle measuring instruments and means for storing the reference value; and wherein the computing means calculates the set of toe angle values from the data generated by the second set of angle measuring instruments and the reference value.

12. The apparatus of claim 11, wherein the reference value is the width difference of the vehicle.

13. An apparatus for determining the toe angle values of the wheels of a vehicle having at least two front and two rear wheels which comprises:

eight angle measuring instruments mountable relative to the planes of the wheels, including two companion angle measuring instruments mountable to each laterally and longitudinally adjacent pair of wheels, for generating data indicative of the angles between the planes of the laterally and longitudinally adjacent wheels;

computing means in communication with each angle measuring instrument for calculating a set of toe angle values for the vehicle from the data generated by the angle measuring instruments, calculating a reference value related to the geometry of the vehicle from the data generated by the angle measuring instruments, storing the reference value, and calculating the set of toe angle values from the reference value and the data generated by the companion angle measuring instruments mounted on the laterally adjacent pairs of wheels and the companion angle measuring instruments mounted on one pair of longitudinally adjacent wheels.

\* \* \* \* \*